United States Patent
Verardi et al.

(10) Patent No.: US 12,473,453 B2
(45) Date of Patent: Nov. 18, 2025

(54) COATING COMPOSITIONS CONTAINING PHOSPHORUS ACID FUNCTIONAL POLYOL POLYMERS AND COATINGS FORMED THEREFROM

(71) Applicant: PPG Industries Ohio, Inc., Cleveland, OH (US)

(72) Inventors: Christopher A. Verardi, Pittsburgh, PA (US); Susan F. Donaldson, Allison Park, PA (US); Paul H. Lamers, Allison Park, PA (US); Karen Morow, Verona, PA (US); George William Mauer, III, Avon Lake, OH (US); Steven Victor Barancyk, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 903 days.

(21) Appl. No.: 17/290,182

(22) PCT Filed: Nov. 1, 2019

(86) PCT No.: PCT/US2019/059541
§ 371 (c)(1),
(2) Date: Apr. 29, 2021

(87) PCT Pub. No.: WO2020/093010
PCT Pub. Date: May 7, 2020

(65) Prior Publication Data
US 2021/0388228 A1 Dec. 16, 2021

Related U.S. Application Data

(60) Provisional application No. 62/754,188, filed on Nov. 1, 2018.

(51) Int. Cl.
*C09D 143/02* (2006.01)
*C09D 7/63* (2018.01)

(52) U.S. Cl.
CPC ............. *C09D 143/02* (2013.01); *C09D 7/63* (2018.01)

(58) Field of Classification Search
CPC .................................................... C09D 143/02
See application file for complete search history.

(56) References Cited

U.S. PATENT DOCUMENTS

| | | | |
|---|---|---|---|
| 5,239,028 | A | 8/1993 | Nakagawa et al. |
| 6,417,277 | B1 | 7/2002 | Tomizaki et al. |
| 2009/0182083 | A1 | 7/2009 | Ding et al. |
| 2017/0081549 | A1 | 3/2017 | Moussa et al. |

FOREIGN PATENT DOCUMENTS

| | | |
|---|---|---|
| CN | 102395630 A | 3/2012 |
| CN | 102395630 B | 12/2014 |
| EP | 3385295 A1 | 10/2018 |
| JP | 57-141042 | 7/1982 |
| JP | 57121042 A | 7/1982 |
| JP | S57121042 | 7/1982 |
| RU | 2632871 A | 10/2017 |

OTHER PUBLICATIONS

Machine translation of CN 102395630 (Year: 2012).*
Coating Process Editorial Board, "Coating Process (3rd Edition)", Chemical Industry Press, Beijing, 1997, pp. 567.
Fangcheng et al., "The latest coating variety formula and process collection", China Light Industry Press, 1996, pp. 496-497.
Zhaonian, "Coating Process, 2nd", Chemical Industry Press, Beijing, 1996, pp. 111-112.

* cited by examiner

Primary Examiner — Wenwen Cai
(74) Attorney, Agent, or Firm — Krisanne Shideler

(57) ABSTRACT

A coating composition includes: (a) a phosphorus acid functional polyol polymer having an acid value within a range of greater than 7 mg KOH/g and 33 mg KOH/g or less, and a hydroxyl value within a range of from 60 to 200 mg KOH/g; (b) an aminoplast derived crosslinker reactive with the phosphorus acid functional polyol polymer; and (c) a non-aqueous liquid medium. Further, if an external catalyst is present, the coating composition comprises less than 0.25 weight % of the external catalyst based on the total weight of the coating composition. The coating composition cures at a temperature of 100° C. or less.

15 Claims, No Drawings

COATING COMPOSITIONS CONTAINING PHOSPHORUS ACID FUNCTIONAL POLYOL POLYMERS AND COATINGS FORMED THEREFROM

FIELD OF THE INVENTION

The present invention relates to coating compositions containing phosphorus acid functional polyol polymers and coatings formed therefrom.

BACKGROUND OF THE INVENTION

Coatings are applied to a wide variety of substrates to provide color and other visual effects, corrosion resistance, abrasion resistance, chemical resistance, and the like. In addition, various types of coatings, such as coatings applied to automotive substrates including various types of vehicles, can be formed from compositions that are baked and formed at low cure temperatures. However, it is difficult to efficiently cure coating compositions at comparatively low temperatures using aminoplasts, such as melamines, which are typically used in one-component (1k) systems. It is accordingly an objective of the present invention to provide a coating composition that can be cured at comparatively low temperatures using an aminoplast.

SUMMARY OF THE INVENTION

The present invention relates to a coating composition comprising: (a) a phosphorus acid functional polyol polymer comprising an acid value within a range of greater than 7 mg KOH/g and 33 mg KOH/g or less, and a hydroxyl value within a range of from 60 to 200 mg KOH/g; (b) an aminoplast derived crosslinker reactive with the phosphorus acid functional polyol polymer; and (c) a non-aqueous liquid medium. Further, if an external catalyst is present, the coating composition comprises less than 0.25 weight % of the external catalyst based on the total weight of the coating composition. The coating composition also cures at a temperature of 100° C. or less.

The present invention also relates to substrates at least partially coated with the coating compositions described herein.

The present invention further relates to a method of forming a coating over at least a portion of a substrate comprising applying a coating composition as described herein and curing the coating composition at a temperature of 100° C. or less to form a coating over at least of portion of the substrate.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" crosslinker, and the like refer to one or more of any of these items.

As previously described, the present invention is directed to a coating composition comprising a phosphorus acid functional polyol polymer and an aminoplast derived crosslinker reactive with the phosphorus acid functional polyol polymer.

As used herein, the term "polymer" refers to oligomers and homopolymers (e.g., prepared from a single monomer species), copolymers (e.g., prepared from at least two monomer species), terpolymers (e.g., prepared from at least three monomer species) and graft polymers. The term "resin" is used interchangeably with "polymer."

As used herein, a "polyol polymer" refers to a polymer having two or more, such as three or more, hydroxyl functional groups. Further, a "phosphorus acid functional polymer" refers to a polymer comprising phosphorus-containing acid groups. Thus, a "phosphorus acid functional polyol polymer" refers to a polymer comprising hydroxyl functional groups and phosphorus-containing acid groups.

As used herein, a "phosphorus-containing acid group" means oxoacids of phosphorus, including, but not limited to, phosphorous acid and phosphoric acid. Examples of phosphorus-containing acid groups include, but are not limited to: phosphorous acid groups having —O—P(O)(H)(OH); and phosphoric acid groups having —O—P(O)(OH)$_2$.

The moiety comprising the phosphorus acid groups on the phosphorus acid functional polyol polymer may, for example, comprise the structure:

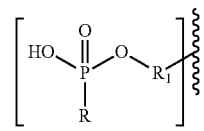

wherein R comprises hydrogen, a hydroxyl group, an alkyl group, an aryl group, or a phosphoester group. $R_1$ comprises an organic linking group (for example, an alkylene group) terminating in a carbon atom that is covalently bonded to a carbon atom present in the polymer backbone.

As used herein, an "alkyl group" refers to a linear, branched, and/or cyclic monovalent, saturated hydrocarbon radical. The alkyl group may include, but is not limited to, a linear or branched $C_1$-$C_{30}$ monovalent hydrocarbon radical, or a linear or branched $C_1$-$C_{20}$ monovalent hydrocarbon radical, or a linear or branched $C_1$-$C_{10}$ monovalent hydrocarbon radical, or a linear or branched $C_1$ to $C_6$ monovalent hydrocarbon radical, or a linear or branched $C_2$ to $C_4$ monovalent hydrocarbon radical, such as ethyl. The alkyl group may also include, but is not limited to, a cyclic $C_3$-$C_{19}$ monovalent hydrocarbon radical, or a cyclic $C_3$-$C_{12}$ monovalent hydrocarbon radical, or a cyclic $C_5$-$C_7$ monovalent hydrocarbon radical.

As used herein, an "aryl group" refers to a substituent derived from an aromatic ring, such as a phenyl group for example. The aryl group can be derived from a monocyclic aromatic ring, a bicyclic aromatic ring, or a polycyclic aromatic ring. The aryl group can also include a heteroaryl group in which at least one carbon atom of the aromatic group is replaced by a heteroatom such as nitrogen, oxygen, sulfur, or a combination thereof.

As used herein, the term "aromatic" refers to a cyclically conjugated hydrocarbon with a stability (due to delocalization) that is significantly greater than that of a hypothetical localized structure.

The term "alkylene" refers to a linear, branched, and/or cyclic divalent, saturated hydrocarbon radical. The alkylene group may include, but is not limited to, a linear or branched $C_1$-$C_{30}$ divalent hydrocarbon radical, or linear or branched $C_1$-$C_{20}$ divalent hydrocarbon radical, or linear or branched $C_1$-$C_{10}$ divalent hydrocarbon radical, or a linear or branched $C_1$ to $C_6$ divalent hydrocarbon radical, or a linear or branched $C_2$ to $C_4$ divalent hydrocarbon radical. The alkylene group may also include, but is not limited to, a cyclic $C_3$-$C_{19}$ divalent hydrocarbon radical, or a cyclic $C_3$-$C_{12}$ divalent hydrocarbon radical, or a cyclic $C_5$-$C_7$ divalent hydrocarbon radical.

As used herein, the term "phosphoester group" refers to an oxygen atom covalently bonded to an alkyl radical or an aryl radical, wherein the oxygen atom is also covalently bonded to a phosphorus atom that is bonded to an additional oxygen atom by a double bond.

As used herein, the term "linear" refers to a compound having a straight chain, the term "branched" refers to a compound having a chain with a hydrogen replaced by a substituent such as an alkyl group that branches or extends out from a straight chain, and the term "cyclic" refers to a closed ring structure.

It is appreciated that the phosphorus acid functional polyol polymer acts as a film-forming resin. As used herein, a "film-forming resin" refers to a self-supporting continuous film on at least a horizontal surface of a substrate upon removal of any diluents or carriers present in the composition or upon curing. The terms "curable", "cure", and the like, as used in connection with a coating composition, means that at least a portion of the components that make up the coating composition are polymerizable and/or crosslinkable. Cure, or the degree of cure, can be determined by dynamic mechanical thermal analysis (DMTA) using a Polymer Laboratories MK III DMTA analyzer conducted under nitrogen in which the degree of cure can for example be at least 10%, such as at least 30%, such as at least 50%, such as at least 70%, or at least 90% of complete crosslinking as determined by DMTA.

The coating composition of the present invention can be cured at ambient conditions, with heat, or with other means such as actinic radiation. The term "actinic radiation" refers to electromagnetic radiation that can initiate chemical reactions. Actinic radiation includes, but is not limited to, visible light, ultraviolet (UV) light, X-ray, and gamma radiation. Further, "ambient conditions" refers to the conditions of the surrounding environment (e.g., the temperature, humidity, and pressure of the room or outdoor environment in which the substrate is located such as, for example, at a temperature of 23° C. and at a relative humidity in the air of 35% to 75%).

The phosphorus acid functional polyol polymer of the present invention can be obtained from reactants comprising (i) an ethylenically unsaturated compound comprising phosphorus acid functional groups, (ii) an ethylenically unsaturated compound comprising hydroxyl functional groups, and (iii) an ethylenically unsaturated compound that is different from (i) and (ii). As used herein, "ethylenically unsaturated" refers to a group having at least one carbon-carbon double bond. Non-limiting examples of ethylenically unsaturated groups include, but are not limited to, (meth)acrylate groups, vinyl groups, other alkenes, and combinations thereof. As used herein, the term "(meth)acrylate" refers to both the methacrylate and the acrylate.

The ethylenically unsaturated compound can comprise ethylenically unsaturated monomers and/or polymers. The ethylenically unsaturated compounds can also comprise mono-ethylenically unsaturated compounds, multi-ethylenically unsaturated compounds, or combinations thereof. A "mono-ethylenically unsaturated compound" refers to a compound comprising only one ethylenically unsaturated group, and a "multi-ethylenically unsaturated compound" refers to a compound comprising two or more ethylenically unsaturated groups.

The ethylenically unsaturated compounds can comprise a linear, branched, or cyclic compound. Further, the cyclic structures of the ethylenically unsaturated compounds can comprise aromatic rings and/or aliphatic rings. An aliphatic ring refers to a non-aromatic structure that contains saturated carbon bonds.

As indicated, the reactants that can form the phosphorus acid functional polyol polymer can include an ethylenically unsaturated compound comprising phosphorus acid functional groups. As used herein, "ethylenically unsaturated compounds comprising phosphorus acid functional groups" refers to compounds comprising at least one ethylenically unsaturated group and at least one phosphorus-containing acid group. The compound can comprise one or multiple phosphorus acid groups.

Non-limiting examples of ethylenically unsaturated compounds comprising phosphorus acid functional groups include ethylenically unsaturated phosphate esters of polyether glycols and which comprise free phosphate acid functionality, such as a mono-ethylenically unsaturated phosphate ester of a polyether glycol. Non-limiting examples of a mono-ethylenically unsaturated phosphate ester of a polyether glycol and which comprise free phosphate acid functionality include phosphate esters of polypropylene glycol monomethacrylate and phosphate esters of polyethylene glycol monomethacrylate. Specific non-limiting examples of ethylenically unsaturated compounds comprising phosphorus acid functional groups include dihydrogen phosphate monomers such as 2-phosphoethyl (meth)acrylate, 2-phosphopropyl (meth)acrylate, 3-phosphopropyl (meth)acrylate, and combinations thereof. Non-limiting examples of commercially available ethylenically unsaturated compounds comprising phosphorus acid functional groups include the compounds commercially available from Solvay under the tradename SIPOMER® PAM 100, 200, 300, 400, and 500, and compounds commercially available from Harcros Chemicals such as under the tradename HARCRYL® 1228.

The ethylenically unsaturated compounds comprising phosphorus acid functional groups can also comprise the following structure:

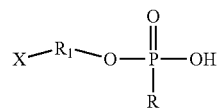

wherein $R_1$ comprises an organic linking group such as comprising an alkylene group. X is an ethlyenically unsaturated group such as a (meth)acrylate group. R comprises hydrogen, a hydroxyl group, an alkyl group, an aryl group, or a phosphoester group. A non-limiting example of such ethylenically unsaturated compounds comprise the above structure in which X is a (meth)acrylate group, $R_1$ is an alkylene group, and R is a hydroxyl group.

The ethylenically unsaturated compound comprising phosphorus acid functional groups can comprise greater than 1.5 weight %, at least 2 weight %, at least 2.5 weight %, at least 3 weight %, at least 4 weight %, or at least 5 weight %, based on the total solids weight of the reactants that form the phosphorus acid functional polyol polymer. The ethylenically unsaturated compound comprising phosphorus acid functional groups can also comprise less than 10 weight %, 9 weight % or less, 8.5 weight % or less, 8 weight % or less, 7.5 weight % or less, 7 weight % or less, or 6.5 weight % or less, based on the total solids weight of the reactants that form the phosphorus acid functional polyol polymer. The ethylenically unsaturated compound comprising phosphorus acid functional groups can comprise an amount within a range (e.g. a range of any of the previously described lower and upper limits) such as, for example, of greater than 1.5 weight % to less than 10 weight %, or greater than 1.5 weight % to 8.5 weight % or less, or from 3 weight % to 7.5 weight % or less, based on the total solids weight of the reactants that form the phosphorus acid functional polyol polymer.

The reactants that form the phosphorus acid functional polyol polymer can further include an ethylenically unsaturated compound comprising hydroxyl functional groups. The compound can comprise one or multiple hydroxyl groups. Non-limiting examples of ethylenically unsaturated compounds comprising hydroxyl functional groups include hydroxyalkyl esters of (meth)acrylic acid such as hydroxymethyl (meth)acrylate, hydroxyethyl (meth)acrylate, hydroxypropyl (meth)acrylate, hydroxybutyl (meth)acrylate, glyceryl (meth)acrylate, and combinations thereof.

The ethylenically unsaturated compound comprising hydroxyl functional groups can comprise at least 5 weight %, at least 10 weight %, or at least 15 weight %, based on the total solids weight of the reactants that form the phosphorus acid functional polyol polymer. The ethylenically unsaturated compound comprising hydroxyl functional groups can also comprise up to 50 weight %, up to 40 weight %, or up to 30 weight %, based on the total solids weight of the reactants that form the phosphorus acid functional polyol polymer. The ethylenically unsaturated compound comprising hydroxyl functional groups can comprise an amount within a range such as, for example, from 5 weight % to 50 weight %, or from 5 weight % to 40 weight %, or from 10 weight % to 30 weight %, based on the total solids weight of the reactants that form the phosphorus acid functional polyol polymer.

As previously described, the reactants that form the phosphorus acid functional polyol polymer can further include an ethylenically unsaturated compound that is different from (i) and (ii). That is, the ethylenically unsaturated compound that is different from (i) and (ii) is selected from ethylenically unsaturated compounds that do not include phosphorus acid and hydroxyl functional groups. The ethylenically unsaturated compound that is different from (i) and (ii) can include other functional groups. Alternatively, the ethylenically unsaturated compound that is different from (i) and (ii) comprises a non-functional ethylenically unsaturated compound. As used herein, a "non-functional ethylenically unsaturated compound" refers to a compound that only contains ethylenically unsaturated groups and is free of all other reactive functional groups.

The ethylenically unsaturated compound that is different from (i) and (ii) can also comprise one or a combination of different types of ethylenically unsaturated compounds different from (i) and (ii). For example, the ethylenically unsaturated compound that is different from (i) and (ii) can comprise a mono-ethylenically unsaturated compound such as a non-functional mono-ethylenically unsaturated compound, a mono-ethylenically unsaturated compound having an abstractable hydrogen, or a combination hereof.

As used herein, an "abstractable hydrogen" refers to a hydrogen on a compound that is removed from the compound by a radical. Non-limiting examples of abstractable hydrogen atoms are hydrogen atoms bonded to tertiary carbon atoms such as the hydrogen atoms bonded to the tertiary carbons on 2-ethylhexyl acrylate and isobornyl acrylate. The reactants that form the acid functional polyol polymer can comprise one or multiple ethylenically unsaturated compounds having abstractable hydrogens. For instance, the reactants that form the acid functional polyol polymer can comprise a linear or branched mono-ethylenically unsaturated compound having an abstractable hydrogen and a cyclic mono-ethylenically unsaturated compound having an abstractable hydrogen. The reactants that form the phosphorus acid functional polyol polymer can also be free of ethylenically unsaturated compounds having an abstractable hydrogen.

Non-limiting examples of suitable ethylenically unsaturated compounds that are different from (i) and (ii) include styrene, α-methyl styrene, 2,4-dimethylstyrene, ethylstyrene, isopropylstyrene, butylstyrene, vinyl naphthalene, vinyl toluene, ethylene, propylene, 1-butene, 1-pentene, 1-hexene, 1-octene, 1-octadecene, 3-methyl-1-butene, 4-methyl-1-pentene, cyclopentene, 1,4-hexadiene, 1,5-hexadiene, and divinylbenzene, methyl acrylate, methyl methacrylate, ethyl acrylate, ethyl methacrylate, butyl acrylate, butyl methacrylate, isobutyl acrylate, isobutyl methacrylate, isobornyl acrylate, isobornyl methacrylate, ethylhexyl acrylate, ethylhexyl methacrylate, lauryl methacrylate, lauryl acrylate, octyl acrylate, octyl methacrylate, glycidyl methacrylate, vinyl methacrylate, acetoacetoxyethyl methacrylate, acetoacetoxyethyl acrylate, acetoacetoxypropyl methacrylate, acetoacetopropryl acrylate, di-n-butyl maleate, di-octylmaleate, acrylonitrile, $C_3$-$C_{30}$ vinyl esters, $C_3$-$C_{30}$ vinyl ethers, and combinations thereof.

The ethylenically unsaturated compound that is different from (i) and (ii) can comprise at least 5 weight %, at least 10 weight %, at least 20 weight %, or at least 30 weight %, based on the total solids weight of the reactants that form the phosphorus acid functional polyol polymer. The ethylenically unsaturated compound that is different from (i) and (ii) can also comprise up to 85 weight %, up to 80 weight %, up to 70 weight %, or up to 60 weight %, based on the total solids weight of the reactants that form the phosphorus acid functional polyol polymer. The ethylenically unsaturated compound that is different from (i) and (ii) can comprise an amount within a range such as from 10 weight % to 90 weight %, or from 15 weight % to 80 weight %, or from 20 weight % to 70 weight %, or from 30 weight % to 70 weight %, based on the total solids weight of the reactants that form the phosphorus acid functional polyol polymer.

The phosphorus acid functional polyol polymer can also be formed with other types of reactants, such as other ethylenically unsaturated compounds including carboxylic acid functional ethylenically unsaturated compounds for example. Non-limiting examples of ethylenically unsaturated compounds comprising carboxylic acid functional groups, or the anhydride, include (meth)acrylic acid, dimethylacrylic acid, ethylacrylic acid, allylacetic acid, crotonic acid, vinylacetic acid, itaconic acid, maleic acid, fumaric acid, itaconic anhydride, maleic anhydride, isobutenyl succinic anhydride, citraconic anhydride, and any combination thereof. Alternatively, the reactants that form the phosphorus acid functional polyol polymer can be substantially free (less than 1000 parts per million based on the total reactants), essentially free (less than 100 parts per million based on the total reactants), or completely free (less than 20 parts per billion based on the total reactants) of additional reactants such as carboxylic acid functional ethylenically unsaturated compounds and formed with only the previously described types of reactants.

The reactants that are used to form the phosphorus acid functional polyol polymer can also be substantially free, essentially free, or completely free of polymerizable light stabilizers such as hindered amine light stabilizers, for example. The terms "substantially free of polymerizable light stabilizers" means that the reactants contain less than 1000 parts per million (ppm) of polymerizable light stabilizers such as hindered amine light stabilizers, "essentially free of polymerizable light stabilizers" means that the reactants contain less than 100 ppm of polymerizable light stabilizers such as hindered amine light stabilizers, and "completely free of polymerizable light stabilizers" means that the reactants contain less than 20 parts per billion (ppb) of polymerizable light stabilizers such as hindered amine light stabilizers.

The phosphorus acid functional polyol polymer can be prepared by mixing and reacting all the desired reactants at the same time. Alternatively, the reactants can be reacted in a stepwise manner by first mixing and reacting only a portion of the reactants to form a preliminary reaction product and then mixing and reacting the remaining reactants with the preliminary reaction product. Various types of reaction aids can also be added to the reaction mixture including, but not limited to, polymerization initiators, chain transfer agents, and/or catalysts.

The reactants and other optional components can also be combined and reacted in a liquid medium such as a non-aqueous liquid medium. As used herein, the term "non-aqueous" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5% water, based on the total weight of the liquid medium. The solvents that make up more than 50 weight % of the liquid medium include organic solvents. Non-limiting examples of suitable organic solvents include polar organic solvents e.g. protic organic solvents such as glycols, glycol ether alcohols, alcohols; and ketones, glycol diethers, esters, and diesters. Other non-limiting examples of organic solvents include aromatic and aliphatic hydrocarbons.

It is appreciated that the phosphorus acid functional polyol polymer of the present invention prepared with the previously described reactants is an addition polymer that comprises phosphorus acid and hydroxyl functional groups. As used herein, an "addition polymer" refers to a polymer at least partially derived from ethylenically unsaturated monomers. For instance, the phosphorus acid functional polyol polymer can comprise a phosphorus acid functional (meth) acrylic polyol polymer in which at least some of the reactants that form the polymer are (meth)acrylic compounds as previously described.

The polymer can also comprise other functional groups such as keto functional groups (also referred to as ketone functional groups), aldo functional groups (also referred to as aldehyde functional groups), amine groups, thiol groups, carbamate groups, amide groups, urea groups, and combinations thereof. Alternatively, the polymer of the present invention can be free of additional functional groups other than the hydroxyl and phosphorus acid functional groups.

The phosphorus acid functional polyol polymer of the present invention can also be prepared by other techniques. For example, the phosphorus acid functional polyol polymer of the present invention can be prepared by incorporating a phosphorus acid compound into a polymer after synthesis of the polymer in a post-modification method.

The phosphorus acid functional polyol polymer can have a hydroxyl value of at least 60 mg KOH/g, at least 80 mg KOH/g, at least 100 mg KOH/g, at least 110 mg KOH/g, at least 120 mg KOH/g, or at least 135 mg KOH/g. The phosphorus acid functional polyol polymer can also have a hydroxyl value of up to 200 mg KOH/g, up to 180 mg KOH/g, or up to 165 mg KOH/g. The phosphorus acid functional polyol polymer can further have a hydroxyl value within a range of from 60 to 200 mg KOH/g, or from 80 to 200 mg KOH/g, or from 100 to 180 mg KOH/g, or from 135 to 165 mg KOH/g.

The phosphorus acid functional polyol polymer can have an acid value of greater than 7 mg KOH/g, 8 mg KOH/g or greater, 10 mg KOH/g or greater, 12 mg KOH/g or greater, at least 13 mg KOH/g, at least 15 mg KOH/g, or at least 20 mg KOH/g. The phosphorus acid functional polyol polymer can also have an acid value of 33 mg KOH/g or less, 30 mg KOH/g or less, or 27 mg KOH/g or less. The phosphorus acid functional polyol polymer can further have an acid value within a range such as, for example, of greater than 7 mg KOH/g and 33 mg KOH/g or less, or from greater than 7 mg KOH/g to 30 mg KOH/g or less, or from greater than 7 mg KOH/g to 27 mg KOH/g or less, or from 10 to 27 mg KOH/g, or from 13 to 27 mg KOH/g.

It is appreciated that the previously described acid values can be derived solely from the phosphorus acid groups. For example, the phosphorus acid functional polyol polymer can be substantially free (less than 1000 parts per million), essentially free (less than 100 parts per million), or completely free (less than 20 parts per billion) of different acid groups, or the corresponding anhydrides thereof, other than the phosphorus acid groups.

Acid values and hydroxyl values are determined using a Metrohm 798 MPT Titrino automatic titrator according to ASTM D 4662-15 and ASTM E 1899-16. The acid and hydroxyl values are based on resin solids.

The phosphorus acid functional polyol polymer can have glass transition temperature ($T_g$) of at least −40° C., at least −20° C., or at least −10° C. The phosphorus acid functional polyol polymer can also have a Tg of 80° C. or less, 60° C. or less, or 50° C. or less. The phosphorus acid functional polyol polymer can further have a Tg within a range of from −40 to 80° C., or from −20 to 60° C., or from −10 to 50° C.

The Tg is determined using differential scanning calorimetry (DSC). During the Tg testing, a specimen of each sample is weighed and sealed in an aluminum hermetic pan and scanned twice in a TAI Discovery DSC from −70 to 200° C. at 20° C./min. The DSC is calibrated with indium, tin, and zinc standards, and the nominal nitrogen purge rate is 50 mL/min. The half-height glass transition temperatures (Tg) were determined by using two points and the peak areas were calculated using a linear baseline.

The phosphorus acid functional polyol polymer can comprise an absolute weight average molecular weight of at least 1,000 g/mol, or at least 1,500 g/mol, at least 10,000 g/mol, or at least 20,000 g/mol. The phosphorus acid functional polyol polymer can comprise an absolute weight average molecular weight of 200,000 g/mol or less, or 150,000 g/mol or less, or 100,000 g/mol or less, or 90,000 g/mol or less, or 60,000 g/mol or less, or 30,000 g/mol or less. The phosphorus acid functional polyol polymer can comprise an absolute weight average molecular weight within a range such as, for example, of from 1,000 g/mol to 200,000 g/mol, or from 1,500 g/mol to 100,000 g/mol, or from 1,500 g/mol to 60,000 g/mol, or from 1,000 g/mol to 15,000 g/mol, or from 1,000 g/mol to 10,000 g/mol, or from 1,000 g/mol to 5,000 g/mol, or from 1,500 g/mol to 3,500 g/mol.

The absolute weight average molecular weight is measured by size-exclusion chromatography (SEC)-triple detection, using a Waters 2695 separation module with a Wyatt Technology Light Scattering detector (miniDAWN), a differential refractive index detector (Optilab rEX)), and a Differential Viscometer detector (Viscostar). Tetrahydrofuran (THF) is used as the eluent at a flow rate of 1 ml min-1, and three PL Gel Mixed C columns were used. Samples are vacuum dried (without heating) prior to analysis. Absolute weight average molecular weight can be measured without reference to calibration standards.

The phosphorus acid functional polyol polymer can comprise at least 5 weight %, at least 10 weight %, at least 20 weight %, at least 30 weight %, or at least 40 weight %, of the coating composition, based on the total solids weight of the coating composition. The phosphorus acid functional polyol polymer can comprise up to 95 weight %, up to 90 weight %, or up to 80 weight %, of the coating composition, based on the total solids weight of the coating composition. The phosphorus acid functional polyol polymer can comprise an amount within a range such as for example of from 5 weight % to 95 weight %, or from 10 weight % to 90 weight %, or from 20 weight % to 80 weight % of the coating composition, based on the total solids weight of the coating composition.

As previously described, the coating composition comprises an aminoplast derived crosslinker(s) reactive with one or more functional groups of the phosphorus acid functional polyol polymer. As used herein, the term "crosslinker" refers to a molecule comprising two or more functional groups that are reactive with other functional groups and which is capable of linking two or more monomers or polymer molecules through chemical bonds such as during a curing process. Further, "aminoplast derived" refers to a compound that is derived from or comprising an aminoplast. As used herein, an "aminoplast" refers to a compound formed from the reaction of an aldehyde such as formaldehyde, with a melamine. Thus, the coating composition comprises a crosslinker derived from or comprising an aminoplast compound and which has functional groups reactive with at least some of the functional groups on the phosphorus acid functional polyol polymer.

Non-limiting examples of aminoplast derived crosslinkers include resins obtained from a reaction between a melamine and an aldehyde such as, for example, melamine-formaldehyde resins, glycolurils, and combinations thereof. Melamine-formaldehyde resins that can be used with the present invention include fully alkylated (contain all alkyl groups) melamine-formaldehyde resins, partially alkylated (only contain some alkyl groups) melamine-formaldehyde resins, alkylated melamine-formaldehyde adducts, that contain alkylol groups, that contain imino groups, or any combination thereof. Suitable melamine crosslinkers are commercially available from Allnex under the tradename Cymel® and from Ineos under the tradename Resimene®.

The aminoplast derived crosslinker can comprise at least 5 weight %, at least 10 weight %, or at least 15 of the coating composition, based on the total solids weight of the coating composition. The aminoplast derived crosslinker can comprise 60 weight % or less, 50 weight % or less, or 40 or less of the coating composition, based on the total solids weight of the coating composition. The aminoplast derived crosslinker can comprise an amount within a range such as from 5 weight % to 60 weight %, or from 10 weight % to 50 weight %, or from 10 weight % to 40 weight % of the coating composition, based on the total solids weight of the coating composition.

The coating composition can also include a certain amount of the phosphorus acid functional polyol polymer to the aminoplast derived crosslinker. For example, the coating composition can comprise a weight ratio of the phosphorus acid functional polyol polymer to the aminoplast derived crosslinker of from 90:10 to 10:90, or from 80:20 to 40:60, or from 80:20 to 50:50, or from 80:20 to 60:40.

The coating composition further comprises a non-aqueous liquid medium. As previously defined, the non-aqueous liquid medium comprises one or more organic solvents that make up more than 50 weight % of the non-aqueous liquid medium. As such, the components that form the coating composition are combined and mixed in a non-aqueous liquid medium and therefore are solvent-borne coating compositions.

The coating composition can also comprise additional components. For example, the coating composition can also comprise additional film-forming resins. The additional resins can include any of a variety of thermoplastic and/or thermosetting resins known in the art. As used herein, the term "thermosetting" refers to resins that "set" irreversibly upon curing or crosslinking, wherein the polymer chains are joined together by covalent bonds. This property is usually associated with a cross-linking reaction often induced, for example, by heat or radiation. Curing or crosslinking reactions also may be carried out under ambient conditions. Once cured, a thermosetting resin will not melt upon the application of heat and is insoluble in solvents. As noted, the additional resins can also include a thermoplastic resin. As used herein, the term "thermoplastic" refers to resins that include polymeric components that are not joined by covalent bonds and, thereby, can undergo liquid flow upon heating.

The additional resins can be selected from, for example, polyurethanes, polyester polymers, polyamide polymers, polyether polymers, polysiloxane polymers, epoxy resins, copolymers thereof, and mixtures thereof. Thermosetting resins typically comprise reactive functional groups. The reactive functional groups can include, but are not limited to, amine groups, epoxide groups, alkoxy groups, hydroxyl groups, thiol groups, carbamate groups, amide groups, urea groups, and combinations thereof.

Thermosetting resins are typically reacted with a crosslinker. As such, when additional film-forming resins are used in the coating composition, the additional film-forming resins can be reacted with additional crosslinkers and/or the aminoplast derived crosslinker also reactive with the phosphorus acid functional polyol polymer. Non-limiting examples of such crosslinkers include aziridines, epoxy resins, anhydrides, alkoxysilanes, carbodiimides, polyhydrazides, polyamines, polyamides, and any combination thereof. The thermosetting resins can also have functional groups that are reactive with themselves; in this manner, such resins are self-crosslinking.

The coating composition can also be substantially free, essentially free, or completely free of any of additional resins and/or crosslinkers including any of the previously described additional resins and/or crosslinkers (for example, such that the phosphorus acid functional polyol polymer and aminoplast derived crosslinker are the only resinous materials). The terms "substantially free of additional resins and/or crosslinkers" means that the coating composition contains less than 1000 parts per million (ppm) of additional resins and/or crosslinkers, "essentially free of additional resins and/or crosslinkers" means that the coating composition contains less than 100 ppm of additional resins and/or crosslinkers, and "completely free of additional resins and/or crosslinkers" means that the coating composition contains less than 20 parts per billion (ppb) of additional resins and/or crosslinkers. The amount is based on the total weight of the composition. For example, the coating composition can be substantially free, essentially free, or completely free of non-aminoplast crosslinkers such as being substantially free, essentially free, or completely free of isocyanates and blocked isocyanates.

The coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof.

Example dyes include, but are not limited to, those that are solvent and/or aqueous based such as phthalo green or blue, iron oxide, bismuth vanadate, anthraquinone, and perylene and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

The colorant can also comprise a special effect composition or pigment. As used herein, a "special effect composition or pigment" refers to a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Non-limiting examples of special effect compositions can include transparent coated mica and/or synthetic mica, coated silica, coated alumina, aluminum flakes, a transparent liquid crystal pigment, a liquid crystal coating, and combinations thereof.

Other non-limiting examples of components that can be used with the coating compositions of the present invention include plasticizers, abrasion resistant particles, fillers including, but not limited to, micas, talc, clays, and inorganic minerals, anti-oxidants, surfactants, flow and surface control agents, thixotropic agents, reactive diluents, reaction inhibitors, corrosion-inhibitors, and other customary auxiliaries.

Further, if an external catalyst is present in the coating composition, the coating composition comprises less than 0.25 weight %, or less than 0.20 weight %, or less than 0.15 weight %, of external catalyst based on the total weight of the coating composition. The coating composition can also be substantially free, essentially free, or completely free of an external catalyst. As used herein, an "external catalyst" refers to a separate component added to a composition that increases the reaction rate between other components, such as the reaction rate between a film-forming resin and crosslinker to form a coating. Further, the terms "substantially free of external catalyst" means that the coating composition contains less than 1000 parts per million (ppm) of external catalyst, "essentially free of external catalyst" means that the coating composition contains less than 100 ppm of external catalyst, and "completely free of external catalyst" means that the coating composition contains less than 20 parts per billion (ppb) of external catalyst. The amount is based on the total weight of the coating composition. Non-limiting examples of external catalysts include external metal catalysts such as tin, external acid catalysts such as sulfonic acid and phosphoric acid, base catalysts such as amines, and combinations thereof.

After forming the coating composition of the present invention, the composition can be applied to a wide range of substrates known in the coatings industry. For example, the coating composition of the present invention can be applied to automotive substrates (e.g. automotive vehicles including but not limited to cars, buses, trucks, trailers, etc.), industrial substrates, aircraft and aircraft components, marine substrates and components such as ships, vessels, and on-shore and off-shore installations, storage tanks, windmills, nuclear plants, packaging substrates, wood flooring and furniture, apparel, electronics, including housings and circuit boards, glass and transparencies, sports equipment, including golf balls, stadiums, buildings, bridges, and the like. These substrates can be, for example, metallic or non-metallic.

Metallic substrates include, but are not limited to, tin, steel (including electrogalvanized steel, cold rolled steel, hot-dipped galvanized steel, steel alloys or blasted/profiled steel, among others), aluminum, aluminum alloys, zinc-aluminum alloys, steel coated with a zinc-aluminum alloy, and aluminum plated steel. As used herein, blasted or profiled steel refers to steel that has been subjected to abrasive blasting and which involves mechanical cleaning by continuously impacting the steel substrate with abrasive particles at high velocities using compressed air or by centrifugal impellers. The abrasives are typically recycled/reused materials and the process can efficiently removal mill scale and rust. The standard grades of cleanliness for abrasive blast cleaning is conducted in accordance with BS EN ISO 8501-1.

Further, non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethylene terephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

The coating compositions of the present invention can be applied by any means standard in the art, such as electrocoating, spraying, electrostatic spraying, dipping, rolling, brushing, and the like. The coatings formed from the coating compositions of the present invention can be applied to a dry film thickness of from 10 to 100 microns, or from 20 to 60 microns.

The coating composition can be applied to a substrate to form a monocoat. As used herein, a "monocoat" refers to a single layer coating system that is free of additional coating layers. Thus, the coating composition comprising the corrosion inhibitor can be applied directly to a substrate without any intermediate coating layer and cured to form a single layer coating, i.e. a monocoat. The coating composition can also be directly over a pretreated substrate as a monocoat. For example, the substrate can be pretreated with an iron phosphate treatment, zinc phosphate treatment, zirconium treatment, titanium treatment, or silane treatment.

Alternatively, the coating composition comprising can be applied to a substrate as a first coating layer along with additional coating layers, such as a second coating layer, to form a multi-layer coating system. It is appreciated that the multi-layer coating can comprise multiple coating layers such as three or more, or four or more, or five or more, coating layers. For example, the previously described coating composition comprising of the present invention can be applied to a substrate as a primer and second and third coating layers, and optionally additional coatings layers, can be applied over the primer layer as basecoats and/or topcoats. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally including components (such as pigments) that impact the color and/or provide other visual impact, and which may be overcoated with a protective and decorative topcoat.

The additional coating layers, such as a second and third coating layer, can be formed from a coating composition that includes a film-forming resin that is the same or different from the first coating layer. The additional coating layers can be prepared with any of the film-forming resins, crosslinkers, colorants, and/or other components previously described. Further, each coating composition can be applied as a dry-on-dry process where each coating composition is dried or cured to form a coating layer prior to application of another coating composition. Alternatively, all or certain combinations of each coating composition described herein can be applied as a wet-on-wet process and dried or cured together. The multi-layer coatings can also be prepared with a primer layer, a first basecoat applied over at least a portion of the primer layer, a second basecoat applied over at least portion of the second basecoat layer, and a topcoat applied over at least a portion of the second basecoat layer in which at least one of the layers, such as the first and/or second basecoat or the topcoat, are prepared from the coating composition of the present invention previously described.

The coating layer or layers prepared with the coating composition previously described can be a colored layer (e.g. a basecoat), or a clear layer (e.g. a topcoat). As used herein, a "clear coating layer" refers to a coating layer that is at least substantially transparent or fully transparent. The term "substantially transparent" refers to a coating wherein a surface beyond the coating is at least partially visible to the naked eye when viewed through the coating. The term "fully transparent" refers to a coating wherein a surface beyond the coating is completely visible to the naked eye when viewed through the coating. It is appreciated that the clear layer can comprise colorants, such as pigments, provided that the colorants do not interfere with the desired transparency of the clear topcoat layer. Alternatively, the clear layer is free of colorants such as pigments (i.e., unpigmented).

It was found that the coating composition comprising the phosphorus acid functional polyol polymer and the aminoplast derived crosslinker reactive with the phosphorus acid functional polyol polymer can be cured at low temperatures to form a coating with desirable properties. For example, the coating composition can be cured at a temperature of 100° C. or less, 90° C. or less, or 80° C. or less. The coating composition can be cured at the previously described temperatures in a period of time of 1 hour or less, or 30 minutes or less, or 20 minutes or less.

The present invention is also directed to a method of forming a coating over at least a portion of a substrate. The method includes applying the previously described coating composition of the present invention over at least a portion of a substrate and curing the coating composition to form a coating over at least of portion of the substrate. The coating composition can be cured at temperatures of 100° C. or less, or 90° C. or less, or 80° C. or less. The coating composition can be cured at the previously described temperatures in a period of time of 1 hour or less, or 30 minutes or less, or 20 minutes or less.

It was found that the coating composition of the present invention can cure rapidly at low temperatures in the absence of an external catalyst such as at temperatures previously described. The coating compositions of the present invention also provides comparable or better lifetimes and cure speeds as compared to coating compositions that contain external catalysts. The coatings formed from the coating compositions have also been found to provide hard films with good solvent resistance and appearance without using external catalysts for cure such as external metal, acid, and amine catalysts for example. It was also found that the coating compositions of the present invention can provide a stable one-component (1k) composition that is cured at the previously described temperatures.

As used herein, a "one-component composition" refers to a composition wherein all the coating components are maintained in the same container after manufacture, during storage, etc. In contrast, a multi-component composition, such as a two component composition ("2K") or more, has at least two components that are maintained in a different container after manufacture, during storage, etc. prior to application and formation of the coating over a substrate.

The present invention is also directed to the following aspects.

A first aspect is directed to a coating composition comprising: (a) a phosphorus acid functional polyol polymer comprising an acid value within a range of greater than 7 mg KOH/g and 33 mg KOH/g or less, and a hydroxyl value within a range of from 60 to 200 mg KOH/g; (b) an aminoplast derived crosslinker reactive with the phosphorus acid functional polyol polymer; and (c) a non-aqueous liquid medium, wherein, if an external catalyst is present, the coating composition comprises less than 0.25 weight % of the external catalyst based on the total weight of the coating composition, and wherein the coating composition cures at a temperature of 100° C. or less.

A second aspect is directed to the coating composition of the first aspect, wherein the coating composition is substantially free of an external catalyst.

A third aspect is directed to the coating composition of the first or second aspect, the phosphorus acid functional polyol polymer is obtained from reactants comprising: (i) an ethylenically unsaturated compound comprising phosphorus acid functional groups, (ii) an ethylenically unsaturated compound comprising hydroxyl functional groups, and (iii) an ethylenically unsaturated compound that is different from (i) and (ii).

A fourth aspect is directed to the coating composition of the third aspect, wherein the ethylenically unsaturated compound comprising phosphorus acid functional groups comprises an amount within a range of greater than 1.5 weight % and less than 10 weight %, based on the total solids weight of the reactants that form the phosphorus acid functional polyol polymer.

A fifth aspect is directed to the coating composition of the third or fourth aspects, wherein the ethylenically unsaturated compound comprising phosphorus acid functional groups comprises a mono-ethylenically unsaturated phosphate ester of a polyether glycol.

A sixth aspect is directed to the coating composition of any one of the third through fifth aspects, wherein the ethylenically unsaturated compound comprising hydroxyl functional groups comprises an amount within a range of from 5 weight % to 50 weight %, based on the total solids weight of the reactants that form the phosphorus acid functional polyol polymer.

A seventh aspect is directed to the coating composition of any one of the third through sixth aspects, wherein the ethylenically unsaturated compound that is different from (i) and (ii) comprises a non-functional ethylenically unsaturated compound.

An eighth aspect is directed to the coating composition of any one of the previous aspects, wherein the crosslinker comprises a melamine-formaldehyde crosslinker.

A ninth aspect is directed to the coating composition of any one of the previous aspects, wherein the coating composition is substantially free of isocyanate and blocked isocyanate crosslinkers.

A tenth aspect is directed to the coating composition of any one of the third through ninth aspects, wherein the reactants that form the phosphorus acid functional polyol polymer are substantially free of hindered amine light stabilizers.

An eleventh aspect is directed to the coating composition of any one of the previous aspects, wherein the coating composition comprises a weight ratio of the phosphorus acid functional polyol polymer to the aminoplast derived crosslinker of from 80:20 to 50:50.

A twelfth aspect is directed to the coating composition of any one of the previous aspects, wherein the phosphorus acid functional polyol polymer comprises a hydroxyl value within a range of from 100 mg KOH/g to 180 mg KOH/g.

A thirteenth aspect is directed to the coating composition of any one of the previous aspects, wherein the phosphorus acid functional polyol polymer comprises an acid value within a range of from 13 mg KOH/g to 27 mg KOH/g.

A fourteenth aspect is directed to a substrate at least partially coated with a coating formed from the coating composition of any one of the previous aspects.

A fifteenth aspect is directed to the substrate of the thirteenth aspect, wherein the coating is formed directly over at least a portion of the substrate.

A sixteenth aspect is directed to the substrate of the fourteenth aspect, wherein the coating is formed over at least a portion of a different coating layer formed over at least a portion of the substrate.

A seventeenth aspect is directed to the substrate of the sixteenth, wherein the coating formed over at least a portion of the different coating layer is a clear coating layer.

An eighteenth aspect is directed to the substrate of any one of the fourteenth through seventeenth aspects, wherein the substrate forms at least a portion of a vehicle.

A nineteenth aspect is directed to a method of forming a coating over at least a portion of a substrate comprising: applying the coating composition according to any one of the first through thirteenth aspects over at least a portion of a substrate; and curing the coating composition at a temperature of 100° C. or less to form a coating over at least a portion of the substrate.

A twentieth aspect is directed to the method of the nineteenth aspect, wherein the coating composition is cured at a temperature of 80° C. or less to form a coating over at least a portion of the substrate.

A twenty first aspect is directed to the method of the nineteenth or twentieth aspects, wherein the crosslinker comprises a melamine-formaldehyde crosslinker.

The following examples are presented to demonstrate the general principles of the invention. The invention should not be considered as limited to the specific examples presented. All parts and percentages in the examples are by weight unless otherwise indicated. Further, the acid values and hydroxyl values in the examples were determined using a Metrohm 798 MPT Titrino automatic titrator according to ASTM D 4662-15 and ASTM E 1899-16. The acid and hydroxyl values were based on resin solids.

Comparative Example 1

Preparation of a Polyol Polymer

A polyol polymer was prepared from the components listed in Table 1.

TABLE 1

| | Component | Amount (g) |
|---|---|---|
| Charge 1 | Methylisobutyl ketone | 502 |
| Charge 2 | Butyl acrylate | 360 |
| | Styrene | 180 |
| | 2-Ethylhexyl acrylate | 180 |
| | Hydroxyethyl acrylate | 180 |
| | Tone M201 [1] | 240 |
| | t-dodecyl mercaptan | 7.2 |
| Charge 3 | Luperox ® 575 [2] | 36 |
| | Methylisobutyl ketone | 303.6 |
| Charge 4 | Luperox ® 575 [2] | 3.6 |
| | Methylisobutyl ketone | 63 |
| Charge 5 | Methylisobutyl ketone | 60 |
| Charge 6 | Methylisobutyl ketone | 29 |

[1] Reaction product of one mole of hydroxyethyl methacrylate and one mole of caprolactone commercially available from Union Carbide.
[2] T-Amyl peroxy 2-ethylhexanoate polymerization initiator, commercially available from Arkema.

The contents of Charge 1 was first added to a four necked, 5 liter reaction flask outfitted with a stirrer, gas inlet, thermometer and condenser. The contents were heated to reflux (115-120° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 120° C., cooled, and then filtered. The final solution had a solids content of 56% and a hydroxyl value of 118 mg KOH/g.

Example 2

Preparation of a Phosphorus Acid Functional Polyol Polymer

A phosphorus acid functional polyol polymer was prepared from the components listed in Table 2.

TABLE 2

| | Component | Amount (g) |
|---|---|---|
| Charge 1 | Methylisobutyl ketone | 750 |
| Charge 2 | Isobornyl methacrylate | 450 |
| | Styrene | 450 |
| | 2-Ethylhexyl acrylate | 180 |
| | Sipomer ® PAM 200 [3] | 90 |
| | Hydroxyethyl acrylate | 270 |
| | Tone M201 [1] | 360 |
| | t-dodecyl mercaptan | 10.8 |
| Charge 3 | Luperox ® 575 [2] | 54.3 |
| | Methylisobutyl ketone | 410 |
| Charge 4 | Luperox ® 575 [2] | 5.4 |
| | Methylisobutyl ketone | 95 |
| Charge 5 | Methylisobutyl ketone | 50 |
| Charge 6 | Methylisobutyl ketone | 50 |

[3] Phosphate esters of polypropylene glycol monomethacrylate, commercially available from BYK.

The contents of Charge 1 was first added to a four necked, 5 liter reaction flask outfitted with a stirrer, gas inlet, thermometer and condenser. The contents were heated to reflux (115-120° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 120° C., cooled, and then filtered. The final solution had a solids content of 56%, a viscosity of 1300 cps, a hydroxyl value of 118 mg KOH/g, and an acid value of 13 mg KOH/g.

Example 3

Preparation of a Phosphorus Acid Functional Polyol Polymer

A phosphorus acid functional polyol polymer was prepared from the components listed in Table 3.

TABLE 3

| | Component | Amount (g) |
|---|---|---|
| Charge 1 | Methylisobutyl ketone | 750 |
| Charge 2 | Isobornyl methacrylate | 450 |
| | Styrene | 450 |
| | 2-Ethylhexyl acrylate | 180 |
| | Sipomer ® PAM 100 [4] | 90 |
| | Hydroxyethyl acrylate | 270 |
| | Tone M201 [1] | 360 |
| | t-dodecyl mercaptan | 10.8 |
| Charge 3 | Luperox ® 575 [2] | 54.3 |
| | Methylisobutyl ketone | 410 |
| Charge 4 | Luperox ® 575 [2] | 5.4 |
| | Methylisobutyl ketone | 95 |
| Charge 5 | Methylisobutyl ketone | 50 |
| Charge 6 | Methylisobutyl ketone | 50 |

[4] Phosphate esters of polyethylene glycol monomethacrylate, commercially available from BYK.

The contents of Charge 1 was first added to a four necked, 5 liter reaction flask outfitted with a stirrer, gas inlet, thermometer and condenser. The contents were heated to reflux (115-120° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 120° C., cooled, and then filtered. The final solution had a solids content of 56%, a viscosity of 1400 cps, a hydroxyl value of 118 mg KOH/g, and an acid value of 13 mg KOH/g.

Example 4

Preparation of a Phosphorus Acid Functional Polyol Polymer

A phosphorus acid functional polyol polymer was prepared from the components listed in Table 4.

TABLE 4

| | Component | Amount (g) |
|---|---|---|
| Charge 1 | Butyl Acetate | 300 |
| | Isopropanol | 202 |
| Charge 2 | Isobornyl methacrylate | 520 |
| | Styrene | 500 |
| | 2-Ethylhexyl acrylate | 220 |
| | Monomer 15 [5] | 60 |
| | Hydroxyethyl acrylate | 300 |
| | Tone M201 [1] | 400 |
| | t-dodecyl mercaptan | 20 |
| Charge 3 | Vazo ™ 67 [6] | 121.2 |
| | Butyl Acetate | 460 |
| Charge 4 | Vazo ™ 67 [6] | 10.1 |
| | Butyl Acetate | 95 |

TABLE 4-continued

| | Component | Amount (g) |
|---|---|---|
| Charge 5 | Butyl Acetate | 25 |
| Charge 6 | Butyl Acetate | 25 |

[5] A phosphate acid ester ethylenically unsaturated compound, commercially available from Johoku Chemical.
[6] 2,2'-Azobis(2-methylbutyronitrile) polymerization initiator.

The contents of Charge 1 was first added to a four necked, 5 liter reaction flask outfitted with a stirrer, gas inlet, thermometer and condenser. The contents were heated to reflux (115-120° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 85° C., cooled, and then filtered. The final solution had a solids content of 66%, a viscosity of 2500 cps, a hydroxyl value of 118 mg KOH/g, and an acid value of 13 mg KOH/g.

Example 5

Preparation of Coating Compositions

Each of the polyol polymer of Examples 1-4 were mixed with melamine crosslinkers to form separate coating compositions. Each coating composition contained 75 weight % of the respective polyol polymer based on the total resins solids and 25 weight % of melamine crosslinker based on the total resins solids.

Example 6

Application and Evaluation of Coatings

The coating compositions prepared in Example 5 were diluted with butyl acetate to an appropriate viscosity (~50% solids) and drawn down with a 6 mil bar over electrocoated steel panels and cured for 30 minutes at 80° C. The König pendulum hardness and solvent resistance were evaluated to confirm the extent of cure. The results are shown in Table 5.

TABLE 5

| Polyol polymer | Phosphorus acid monomer | Melamine crosslinker | König hardness [8] | Solvent resistance [9] |
|---|---|---|---|---|
| Comparative Example 1 | None | Resimene ® CE7103 [10] | n/a [11] | <5 |
| Example 2 | Sipomer ® PAM 200 [3] | Resimene ® CE7103 [10] | 165 s | >100 |
| Example 3 | Sipomer ® PAM 100 [4] | Resimene ® CE7103 [10] | 147 s | >100 |
| Example 4 | Monomer 15 [5] | Resimene ® CE7103 [10] | 150 s | >100 |

[8] Conducted using a modified version of ASTM D4366-16 by placing each coated panel on the table of a stand (towards the top of the equipment) with the paint film uppermost. The fulcrum balls of the pendulum were cleaned by wiping with a soft tissue wetted with solvent and allowed to dry thoroughly before lowering it gently on to the test panel. The pendulum was deflected without lateral displacement of the fulcrum to 6° and allowed to rest against the stop on the stand. The pendulum was released while simultaneously starting the counter. The time for the oscillations to fall to 3° was recorded. The test was performed at ambient lab conditions, generally 22° C. at 30-60% relative humidity.
[9] Conducted according to a modified version of ASTM D 5402-15 by placing each coated panel coating side up on a flat surface. A saturate cotton tipped applicator with MEK was then rubbed on the panels using maximum pressure in a forward and backward motion covering a strip approximately three inches in length. One "double rub" was performed as a complete forward and backward motion. The number of double rubs (maximum 100) were recorded to break through the top layer.
[10] Hexamethoxymethyl/n-butyl- melamine formaldehyde resin, commercially available from Ineos.
[11] Comparative Example 1 was too soft and coating hardness could not be determined.

As shown in Table 5, the incorporation of the phosphate monomer on the polyol polymer backbone at relatively low levels with respect to polymer Examples 2-4 provided sufficient catalytic activity to cure the melamine crosslinker effectively with good hardness and double rubs as compared to Comparative Example 1.

To demonstrate the breadth of catalytic activity of the phosphate containing polyol polymer, a series of binary mixtures composed individually of different melamine crosslinkers was formulated into compositions with 75 weight % of the respective polyol polymer based on the total resins solids and 25 weight % of melamine crosslinker based on the total resins solids as previously described. Coatings were then formed as previously described and evaluated for extent of cure. The results are shown in Table 6.

TABLE 6

| Polyol polymer | Melamine crosslinker | Crosslinker Type | König hardness [8] | Solvent resistance [9] |
|---|---|---|---|---|
| Example 3 | Resimene ® CE7103 [10] | Alkylated | 165 s | >100 |
| Example 3 | Cymel ® 303 [12] | Alkylated | 138 s | >100 |
| Example 3 | Resimene ® 745 [13] | Alkylated | 140 s | >100 |
| Example 3 | Cymel ® 370 [14] | Methylol | 166 s | >100 |
| Example 3 | Resimene ® HM 2608 [15] | Imino | 177 s | >100 |
| Example 3 | Cymel ® 202 [16] | Imino | 158 s | >100 |

[12] Highly methylated, monomeric melamine crosslinker, commercially available from Allnex.
[13] Hexamethoxymethyl - melamine formaldehyde resin, commercially available from Ineos.
[14] Partially methylated, monomeric melamine crosslinker, commercially available from Allnex.
[15] Imino type, highly reactive methylated melamine-formaldehyde resin, commercially available from Ineos.
[16] Methylated/n-butylated, high imino melamine crosslinker, commercially available from Allnex.

As shown in Table 6, the incorporation of the phosphate monomer on the polyol polymer backbone at relatively low levels with respect to Example 3 provided sufficient catalytic activity to cure various types of melamine crosslinkers effectively and provide a high degree of cure and good film hardness.

Examples 7-12

Preparation of a Phosphorus Acid Functional Polyol Polymers

Phosphorus acid functional polyol polymers were prepared with varying acid values. Comparative Example 7 was prepared from the components listed in Table 7.

TABLE 7

| | Component | Amount (g) |
|---|---|---|
| Charge 1 | Butyl Acetate | 320 |
| | Isopropanol | 202 |
| Charge 2 | Isobornyl methacrylate | 520 |
| | Styrene | 530 |
| | 2-Ethylhexyl acrylate | 220 |
| | Monomer 15 [5] | 30 |
| | Hydroxyethyl acrylate | 300 |
| | Tone M201 [1] | 400 |
| | t-dodecyl mercaptan | 20 |
| Charge 3 | Vazo ™ 67 [6] | 121.2 |
| | Butyl Acetate | 460 |
| Charge 4 | Vazo ™ 67 [6] | 10.1 |
| | Butyl Acetate | 95 |

TABLE 7-continued

| | Component | Amount (g) |
|---|---|---|
| Charge 5 | Butyl Acetate | 40 |
| Charge 6 | Butyl Acetate | 40 |

The contents of Charge 1 was first added to a four necked, 5 liter reaction flask outfitted with a stirrer, gas inlet, thermometer and condenser. The contents were heated to reflux (85° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 85° C., cooled, and then filtered. The final solution had a solids content of 66%, a viscosity of 2600 cps, a hydroxyl value of 118 mg KOH/g, and an acid value of 7 mg KOH/g.

Example 8, in accordance with the present invention, was prepared from the components listed in Table 8.

TABLE 8

| | Component | Amount (g) |
|---|---|---|
| Charge 1 | Butyl Acetate | 320 |
| | Isopropanol | 202 |
| Charge 2 | Isobornyl methacrylate | 490 |
| | Styrene | 500 |
| | 2-Ethylhexyl acrylate | 220 |
| | Monomer 15 [5] | 90 |
| | Hydroxyethyl acrylate | 300 |
| | Tone M201 [1] | 400 |
| | t-dodecyl mercaptan | 20 |
| Charge 3 | Vazo™ 67 [6] | 121.2 |
| | Butyl Acetate | 460 |
| Charge 4 | Vazo™ 67 [6] | 10.1 |
| | Butyl Acetate | 95 |
| Charge 5 | Butyl Acetate | 40 |
| Charge 6 | Butyl Acetate | 40 |

The contents of Charge 1 was first added to a four necked, 5 liter reaction flask outfitted with a stirrer, gas inlet, thermometer and condenser. The contents were heated to reflux (85° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 85° C., cooled, and then filtered. The final solution had a solids content of 66%, a Gardner Holdt viscosity of Z1 cps, a hydroxyl value of 118 mg KOH/g, and an acid value of 20 mg KOH/g.

Example 9, in accordance with the present invention, was prepared from the components listed in Table 9.

TABLE 9

| | Component | Amount (g) |
|---|---|---|
| Charge 1 | Butyl Acetate | 320 |
| | Isopropanol | 200 |
| Charge 2 | Isobornyl methacrylate | 500 |
| | Styrene | 500 |
| | 2-Ethylhexyl acrylate | 160 |
| | Monomer 15 [5] | 120 |
| | Hydroxyethyl acrylate | 300 |
| | Tone M201 [1] | 400 |
| | t-dodecyl mercaptan | 20 |
| Charge 3 | Vazo™ 67 [6] | 121.2 |
| | Butyl Acetate | 460 |
| Charge 4 | Vazo™ 67 [6] | 10.1 |
| | Butyl Acetate | 95 |
| Charge 5 | Butyl Acetate | 40 |
| Charge 6 | Butyl Acetate | 40 |

The contents of Charge 1 was first added to a four necked, 5 liter reaction flask outfitted with a stirrer, gas inlet, thermometer and condenser. The contents were heated to reflux (85° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 85° C., cooled, and then filtered. The final solution had a solids content of 66%, a Gardner Holdt viscosity of Z3 cps, a hydroxyl value of 118 mg KOH/g, and an acid value of 27 mg KOH/g.

Example 10, in accordance with the present invention, was prepared from the components listed in Table 10.

TABLE 10

| | Component | Amount (g) |
|---|---|---|
| Charge 1 | Butyl Acetate | 320 |
| | Isopropanol | 200 |
| Charge 2 | Isobornyl methacrylate | 500 |
| | Styrene | 500 |
| | 2-Ethylhexyl acrylate | 130 |
| | Sipomer® PAM 200 [3] | 150 |
| | Hydroxyethyl acrylate | 300 |
| | Tone M201 [1] | 400 |
| | t-dodecyl mercaptan | 20 |
| Charge 3 | Vazo™ 67 [6] | 121.2 |
| | Butyl Acetate | 460 |
| Charge 4 | Vazo™ 67 [6] | 10.1 |
| | Butyl Acetate | 95 |
| Charge 5 | Butyl Acetate | 40 |
| Charge 6 | Butyl Acetate | 40 |

The contents of Charge 1 was first added to a four necked, 5 liter reaction flask outfitted with a stirrer, gas inlet, thermometer and condenser. The contents were heated to reflux (85° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 85° C., cooled, and then filtered. The final solution had a solids content of 65%, a viscosity of 1,000 cps, a hydroxyl value of 118 mg KOH/g, and an acid value of 18 mg KOH/g.

Example 11 was prepared from the components listed in Table 1.

TABLE 11

| | Component | Amount (g) |
|---|---|---|
| Charge 1 | Butyl Acetate | 320 |
| | Isopropanol | 200 |
| Charge 2 | Isobornyl methacrylate | 500 |
| | Styrene | 500 |
| | 2-Ethylhexyl acrylate | 150 |
| | Monomer 15 [5] | 150 |
| | Hydroxyethyl acrylate | 300 |
| | Tone M201 [1] | 400 |
| | t-dodecyl mercaptan | 20 |
| Charge 3 | Vazo ™ 67 [6] | 121.2 |
| | Butyl Acetate | 460 |
| Charge 4 | Vazo ™ 67 [6] | 10.1 |
| | Butyl Acetate | 95 |
| Charge 5 | Butyl Acetate | 40 |
| Charge 6 | Butyl Acetate | 40 |

The contents of Charge 1 was first added to a four necked, 5 liter reaction flask outfitted with a stirrer, gas inlet, thermometer and condenser. The contents were heated to reflux (85° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 85° C., cooled, and then filtered. The final solution had a solids content of 66%, a viscosity of 2600 cps, a hydroxyl value of 118 mg KOH/g, and an acid value of 33 mg KOH/g.

Comparative Example 12 was prepared from the components listed in Table 12.

TABLE 12

| | Component | Amount (g) |
|---|---|---|
| Charge 1 | Butyl Acetate | 320 |
| | Isopropanol | 200 |
| Charge 2 | Isobornyl methacrylate | 480 |
| | Styrene | 480 |
| | 2-Ethylhexyl acrylate | 140 |
| | Monomer 15 [5] | 200 |
| | Hydroxyethyl acrylate | 300 |
| | Tone M201 [1] | 400 |
| | t-dodecyl mercaptan | 20 |
| Charge 3 | Vazo ™ 67 [6] | 121.2 |
| | Butyl Acetate | 460 |
| Charge 4 | Vazo ™ 67 [6] | 10.1 |
| | Butyl Acetate | 95 |
| Charge 5 | Butyl Acetate | 40 |
| Charge 6 | Butyl Acetate | 40 |

The contents of Charge 1 was first added to a four necked, 5 liter reaction flask outfitted with a stirrer, gas inlet, thermometer and condenser. The contents were heated to reflux (85° C.). The initiator feed (Charge 3) was started and added over 3 hrs 35 minutes. About 5 minutes after starting the initiator feed, the monomer feed of Charge 2 was commenced and added over 3 hrs 30 minutes. Charge 5 was then used to rinse Charge 2 and the solution was held for 1 hr. Charge 4 was next added over 30 min, followed by rinsing with Charge 6. The solution was held for 90 minutes at 85° C., cooled, and then filtered. The final solution had a solids content of 66%, a viscosity of 2600 cps, a hydroxyl value of 118 mg KOH/g, and an acid value of 44 mg KOH/g.

Example 13

Preparation, Application, and Evaluation of Coatings

Part A: Each of the polymers of Examples 7-10 were mixed with the melamine crosslinker Resimene® CE7103 (hexamethoxymethyl/n-butyl-melamine formaldehyde resin, commercially available from Ineos) to form separate coating compositions. Each coating composition contained 75 weight % of the respective polymer based on the total resins solids and 25 weight % of the melamine crosslinker based on the total resins solids.

Part B: The coating compositions prepared in Part A were diluted with butyl acetate to an appropriate viscosity (~50% solids) and drawn down with a 6 mil bar over electrocoated steel panels and cured for 30 minutes at 80° C.

The König pendulum hardness, solvent resistance, and hot water immersion testing were evaluated to confirm the extent of cure. The results are shown in Table 13.

TABLE 13

| Polyol polymer | Weight % of acid monomer [17] | Acid value (mg KOH/g) | König hardness [8] | Solvent resistance [9] | 16 h Water Immersion (140° F.) [18] |
|---|---|---|---|---|---|
| Comparative Example 1 | 0 | 0 | N/A | None | No blush |
| Comparative Example 7 | 1.5 | 7 | 43 s | <100 with film degradation starting around 40 | No blush |
| Example 4 | 3 | 13 | 136 s | >150 | No blush |
| Example 8 | 4.5 | 20 | 150 s | >150 | No blush |
| Example 9 | 6 | 27 | 174 s | >150 | No blush |
| Example 10 | 7.5 | 18 | 158 s | >150 | No blush |
| Example 11 | 7.5 | 33 | 162 s | >150 | Minor blush |
| Comparative Example 12 | 10 | 44 | 161 s | >150 | Blush |

[17] Amount of phosphorus acid monomer used to form the polyol polymer based on the total solids weight of the reactants used to form the polyol polymer.
[17] Coated panels were placed in 140° F. water and held for 16 hrs. The panels were then removed and rated for blush (degradation in the appearance of the cured coating) of the immersed portion relative to the non-immersed portion.

As shown in Table 13, the coatings formed with the polyol polymers having an acid value of 7 mg KOH/g or less provided poor catalytic activity to cure the coating compositions resulting in a low degree of cure and poor film hardness. Further, the coatings formed with the polyol polymers having an acid value of 44 mg KOH/g exhibited full blushing.

The coatings formed with the polyol polymers having acid values 13 mg KOH/g, 18 mg KOH/g, 20 mg KOH/g, and 27 mg KOH/g provided sufficient catalytic activity to cure the coating compositions effectively and provide a high degree of cure, good film hardness, and no blushing. Moreover, the coatings formed with the polyol polymers having an acid value of 33 mg provided sufficient catalytic activity to cure the coating compositions effectively and provide a high degree of cure, and which exhibited a very slight blush.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
   (a) a phosphorus acid functional polyol polymer having an acid value within a range of greater than 7 mg KOH/g and 33 mg KOH/g or less, and a hydroxyl value within a range of from 60 to 200 mg KOH/g, wherein the phosphorus acid functional polyol polymer is obtained from reactants comprising: (i) a mono-ethylenically unsaturated phosphate ester of a polyether glycol, present in the phosphorus acid functional polyol polymer in an amount within a range of greater than 1.5 weight % and less than 10 weight %, based on the total solids weight of the reactants that form the phosphorus acid functional polyol polymer; (ii) an ethylenically unsaturated compound comprising hydroxyl functional groups, and (iii) an ethylenically unsaturated compound that is different from (i) and (ii);
   (b) an aminoplast derived crosslinker reactive with the phosphorus acid functional polyol polymer; and
   (c) a non-aqueous liquid medium,
   wherein, if an external catalyst is present, the coating composition comprises less than 0.25 weight % of the external catalyst based on the total weight of the coating composition, and wherein the coating composition cures at a temperature of 100° C. or less, and wherein the coating composition is substantially free of additional resins and crosslinkers.

2. The coating composition of claim 1, wherein the coating composition is substantially free of an external catalyst.

3. The coating composition of claim 1, wherein the ethylenically unsaturated compound comprising hydroxyl functional groups is present in an amount within a range of from 5 weight % to 50 weight %, based on the total solids weight of the reactants that form the phosphorus acid functional polyol polymer.

4. The coating composition of claim 1, wherein the ethylenically unsaturated compound that is different from (i) and (ii) comprises a non-functional ethylenically unsaturated compound, wherein the non-functional ethylenically unsaturated compound is free of all reactive functional groups other than ethylenically unsaturated functional groups.

5. The coating composition of claim 1, wherein the crosslinker comprises a melamine-formaldehyde crosslinker.

6. The coating composition of claim 1, wherein the reactants that form the phosphorus acid functional polyol polymer are substantially free of hindered amine light stabilizers.

7. The coating composition of claim 1, wherein the weight ratio of the phosphorus acid functional polyol polymer to the aminoplast derived crosslinker is from 80:20 to 50:50, based on the total solids weight of the coating composition.

8. The coating composition of claim 1, wherein the phosphorus acid functional polyol polymer has a hydroxyl value within a range of from 100 mg KOH/g to 180 mg KOH/g.

9. The coating composition of claim 1, wherein the phosphorus acid functional polyol polymer has an acid value within a range of from 13 mg KOH/g to 27 mg KOH/g.

10. A substrate at least partially coated with a coating formed from the coating composition of claim 1.

11. The substrate of claim 10, wherein the coating is formed directly over at least a portion of the substrate.

12. The substrate of claim 10, wherein the coating is formed over at least a portion of a different coating layer formed over at least a portion of the substrate.

13. The substrate of claim 12, wherein the coating formed over at least a portion of the different coating layer is a clear coating layer.

14. The substrate of claim 10, wherein the substrate forms at least a portion of a vehicle.

15. A coating composition comprising:
   (a) a phosphorus acid functional polyol polymer having an acid value within a range of greater than 7 mg KOH/g and 33 mg KOH/g or less, and a hydroxyl value within a range of from 60 to 200 mg KOH/g;
   (b) an aminoplast derived crosslinker reactive with the phosphorus acid functional polyol polymer; and
   (c) a non-aqueous liquid medium,
   wherein, if an external catalyst is present, the coating composition comprises less than 0.25 weight % of the external catalyst based on the total weight of the coating composition; and wherein the coating composition cures at a temperature of 100° C. or less, and wherein the phosphorus acid functional polyol polymer comprises groups having the structure:

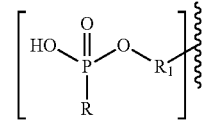

wherein R comprises hydrogen and $R_1$ comprises an organic linking group; and
wherein the coating composition is substantially free of additional resins and crosslinkers.

* * * * *